US008886168B2

(12) United States Patent
Cai et al.

(10) Patent No.: US 8,886,168 B2
(45) Date of Patent: *Nov. 11, 2014

(54) SELECTIVE FIRST DELIVERY ATTEMPT (FDA) PROCESSING FOR TEXT MESSAGES

(71) Applicant: Alcatel-Lucent USA Inc., Murray Hill, NJ (US)

(72) Inventors: Yigang Cai, Naperville, IL (US); Suzann Hua, Lisle, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/019,233

(22) Filed: Sep. 5, 2013

(65) Prior Publication Data
US 2014/0011480 A1    Jan. 9, 2014

Related U.S. Application Data

(63) Continuation of application No. 12/484,672, filed on Jun. 15, 2009, now Pat. No. 8,554,174.

(51) Int. Cl.
*H04W 4/00* (2009.01)
*H04W 4/12* (2009.01)
*H04W 84/04* (2009.01)
*H04W 88/14* (2009.01)

(52) U.S. Cl.
CPC ............. *H04W 4/12* (2013.01); *H04W 84/042* (2013.01); *H04W 88/14* (2013.01)

USPC ........................................ 455/412.1; 455/466

(58) Field of Classification Search
USPC ............ 455/412.1, 412.2, 414.1–414.4, 459, 455/466; 370/328, 349, 496, 522
See application file for complete search history.

(56) References Cited

U.S. PATENT DOCUMENTS

| 7,460,874 B1* | 12/2008 | Hou et al. ..................... 455/466 |
| 7,761,105 B2* | 7/2010 | Harding ........................ 455/466 |
| 2010/0050255 A1* | 2/2010 | Upadhyay et al. .............. 726/22 |

* cited by examiner

*Primary Examiner* — Kent Chang
*Assistant Examiner* — Nelson Rosario
(74) *Attorney, Agent, or Firm* — Duft Bornsen & Fettig, LLP

(57) ABSTRACT

Systems and methods are disclosed for selectively applying First Delivery Attempt (FDA) processing for text messages. A text message system in one embodiment includes a rules database that stores rules defining which text messages are authorized to be delivered using FDA processing. The text message system further includes a message processor that initially receives a text message, and determines whether to selectively apply FDA processing for a time period due to an occurrence of a triggering event. If selective FDA processing applies, then the message processor processes the rules in the rules database to determine whether the text message is authorized for FDA processing during the time period of selective FDA processing. If authorized, then the message processor forwards the text message to an FDA system for FDA processing. If not authorized, then the message processor forwards the text message to a store-and-forward system for store-and-forward processing.

20 Claims, 5 Drawing Sheets

SELECTIVE FIRST DELIVERY ATTEMPT (FDA) PROCESSING FOR TEXT MESSAGES

RELATED APPLICATIONS

This non-provisional patent application is a continuation of U.S. patent application Ser. No. 12/484,672 filed on Jun. 15, 2009, which is incorporated herein by reference as if fully provided herein.

BACKGROUND

1. Field of the Invention

The invention is related to the field of communications and, in particular, to delivery of text messages.

2. Statement of the Problem

In many mobile networks, text messaging has become a very popular mode of communication. Short Message Service (SMS) is a communication protocol allowing the exchange of short text messages (i.e., 160 characters) between mobile devices. Often times, mobile users more frequently use text messaging for communication than voice calls.

Text messages are transmitted over signaling channels of a mobile network, such as over SS7 channels. An SMS Center (SMSC) in the mobile network has a store-and-forward system for delivering text messages to their destinations over the signaling channels. Upon initially receiving a text message, the store-and-forward system first stores (persistently) the text message, and then initiates a delivery attempt for the text message. If the delivery attempt is unsuccessful, then the store-and-forward system retries delivery after a time period (e.g., 10 minutes, 30 minutes, etc). The store-and-forward system will retry delivery a predefined number of times before the text message is discarded.

The following illustrates an example of delivering a text message from an originating mobile device to a destination mobile device in a UMTS network. To start, a sender originates the text message through the originating mobile device, and the originating mobile device sends the text message to an SMSC. A store-and-forward system in the SMSC receives and stores the text message. The store-and-forward system then queries a Home Location Register (HLR) to identify routing information for the text message. The HLR responds to the query with the routing information, and the store-and-forward system then attempts to forward the text message to the destination mobile device based on the routing information. If the first delivery attempt is unsuccessful, then the store-and-forward system retries delivery after a time period. The store-and-forward system will retry delivery a predefined number of times before the text message is discarded.

The store-and-forward approach to text messaging drives up the cost of the SMSC due to the expensive storage subsystems used for storing the text messages before delivery. As the volume of text messages increases in mobile networks, the unit price per text message drops significantly. Thus, profit margins for text messaging have become lower for the network operators. To reduce costs and increase network capability for delivering text messages, some network operators no longer use only store-and-forward processing. Instead, many network operators offer an alternative approach, which is referred to as First Delivery Attempt (FDA) processing. With FDA processing, delivery of a text message to the destination is attempted before it is stored. If delivery fails, then the text message is stored, and normal store-and-forward processing occurs.

The following illustrates an example of FDA processing used to deliver a text message in a UMTS network. The sender originates the text message through an originating mobile device, and the originating mobile device sends the text message to an FDA system. The FDA system initially receives the text message, and queries the HLR to identify routing information for the text message. The HLR responds to the query with the routing information, and the FDA system then attempts to forward the text message to the destination mobile device based on the routing information, without first persistently storing the text message in memory. If the FDA system determines that delivery of the text message failed, then the FDA system routes the text message to the SMSC. The store-and-forward system in the SMSC then stores the text message, and attempts delivery of the text message according to store-and-forward processing.

One problem encountered by network operators is that FDA processing may cause congestion in a mobile network in times of high traffic volume. The message queues in the FDA system are small, so when traffic volume is high the text messages may get delayed in the FDA system. This network congestion may result in failed delivery of text messages and lost revenue for the network operator.

SUMMARY

Embodiments described herein are able to selectively apply FDA processing of text message. In some instances, FDA processing may be used to deliver text messages, while in other instances FDA processing may be temporarily interrupted for a time period for some or all text messages in favor of store-and-forward processing. Thus, not all text messages are automatically forwarded first using FDA processing. One advantage of selectively applying FDA processing in a mobile network is that FDA processing may be replaced or supplemented by store-and-forward processing during periods, such as peak traffic intervals, high traffic times, special traffic scenarios, etc. Store-and-forward processing helps to avoid the network congestion problems encountered by FDA processing.

One embodiment comprises a text message system for a mobile network. The text message system includes a rules database that is operable to store rules defining which text messages are authorized to be delivered using FDA processing. The text message system further includes a message processor operable to initially receive a text message, and to determine whether to selectively apply FDA processing for a time period due to an occurrence of a triggering event. If selective FDA processing applies, then the message processor is further operable to process the rules in the rules database to determine whether the text message is authorized for FDA processing during the time period of selective FDA processing. If the determination is that the text message is authorized, then the message processor is further operable to forward the text message to an FDA system for FDA processing. If the determination is that the text message is not authorized, then the message processor is further operable to forward the text message to a store-and-forward system for store-and-forward processing.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
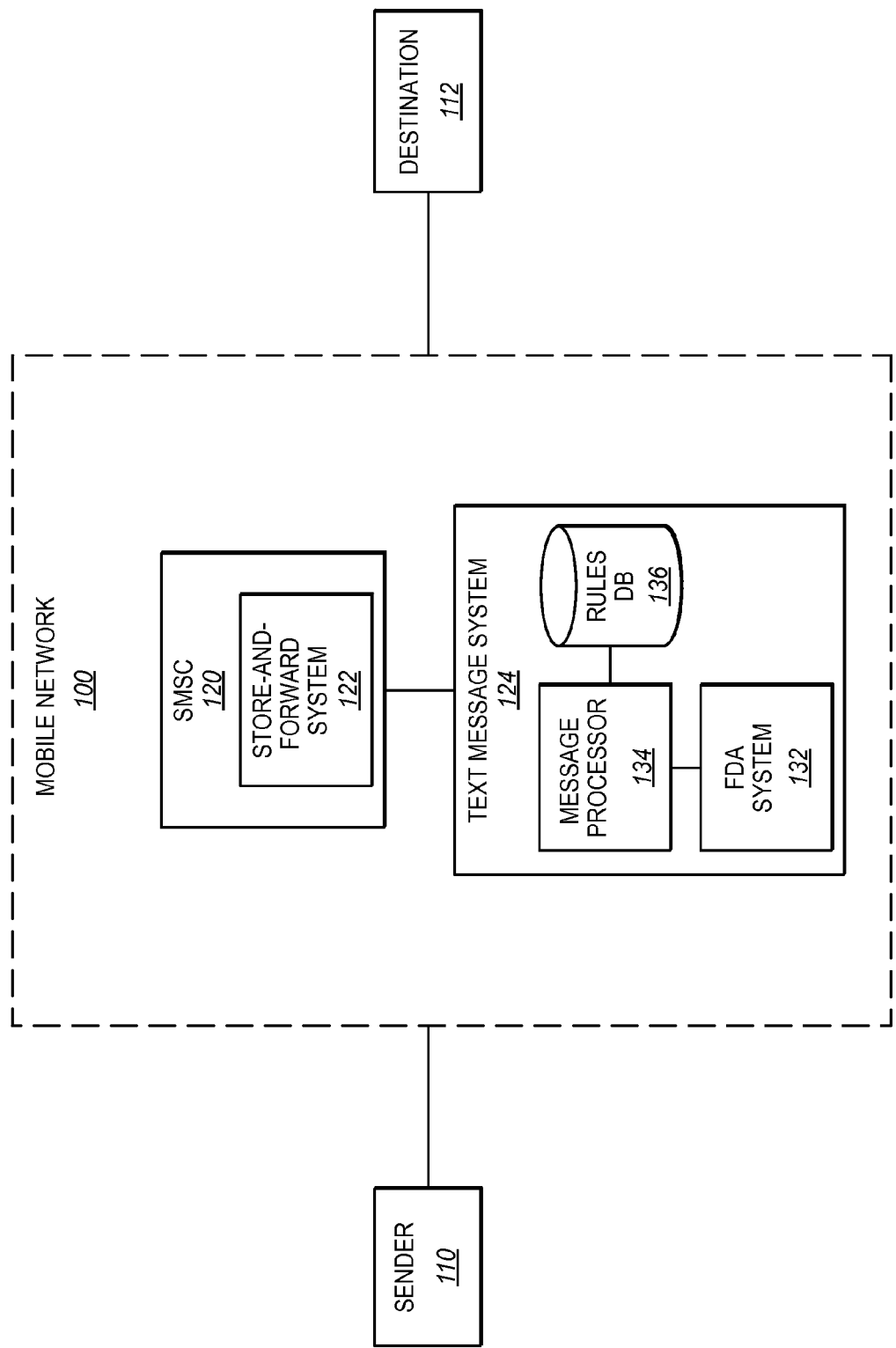
FIG. 1 illustrates a mobile network in an exemplary embodiment.

FIG. 1 illustrates a mobile network 100 in an exemplary embodiment. Mobile network 100 may comprise a circuit-based network, such as a CDMA network or a GSM network, may comprise a packet-based network, such as an IP Multimedia Subsystem (IMS) network, or a mix of the two. Mobile network 100 is able to facilitate the transfer of a text message from a sender 110 to a destination 112. Because sender 110 and destination 112 may be served by different networks, mobile network 100 may represent an "originating" network for a Mobile Originating (MO) scenario, or may represent a "terminating" network for a Mobile Terminating (MT) scenario.

In this embodiment, mobile network 100 includes a Short Message Service Center (SMSC) 120 and a text message system 124. SMSC 120 includes a store-and-forward system 122, which comprises any system, server, application, or function that implements store-and-forward processing, one example of which is defined in SMS protocol. In store-and-forward processing, when a text message is initially received, the text message is persistently stored in memory. Delivery of the text message is then attempted to the destination. If the first delivery attempt is unsuccessful, then delivery is retried after a time period (e.g., 10 minutes, 30 minutes, etc). A predefined number of retries are performed before the text message is discarded. Although store-and-forward system 122 is illustrated as being implemented in SMSC 120, those skilled in the art will appreciate that it may be implemented in other text messaging servers that use protocols other than SMS.

Text message system 124 comprises any system, server, or function operable to handle text messages. Text message system 124 may be a stand-alone system or server, or may be implemented in an SMS router, in a Signaling Transfer Point (STP), or some other network element. Text message system 124 may also be implemented in SMSC 120 along with store-and-forward system 122.

In this embodiment, text message system 124 includes an FDA system 132, a message processor 134, and a rules database 136. FDA system 132 comprises any system, server, application, or function operable to implement FDA processing. In FDA processing, when a text message is initially received, delivery of the text message is attempted first before storing the text message, such as in the SMSC. Those skilled in the art will appreciate that FDA processing may involve briefly queuing the text messages for the delivery attempt. However, the text message is not persistently stored in the SMSC as is done for store-and-forward processing.

Message processor 134 comprises any device, component, system, or application operable to selectively apply how FDA processing is applied in text message system 124. Rules database 136 comprises any storage system operable to store any rules, conditions, policies, or other data that define which text messages are authorized for the FDA processing during a particular time period. For example, during peak traffic periods in mobile network 100, the rules stored in rules database 136 indicates which text messages (if any) are authorized to be delivered according to FDA processing. Although FDA system 132 is shown as being part of text message system 124, those skilled in the art will appreciate that FDA system 132 may be implemented on a completely different platform than message processor 134 and rules database 136.

In FIG. 1, assume that sender 110 sends a text message to mobile network 100 that is intended for destination 112. Those skilled in the art will appreciate that the text message is encapsulated in a signaling message, such as an SS7 message or a SIP message. Instead of automatically applying FDA processing for the text message, text message system 124 is able to selectively apply FDA processing for a time period. When FDA is selectively applied, message processor 134 makes a determination of whether the text message is delivered through FDA processing or store-and-forward processing based on a predefined set of rules. A more detailed operation of text message system 124 is illustrated in FIG. 2.

Figure 2:
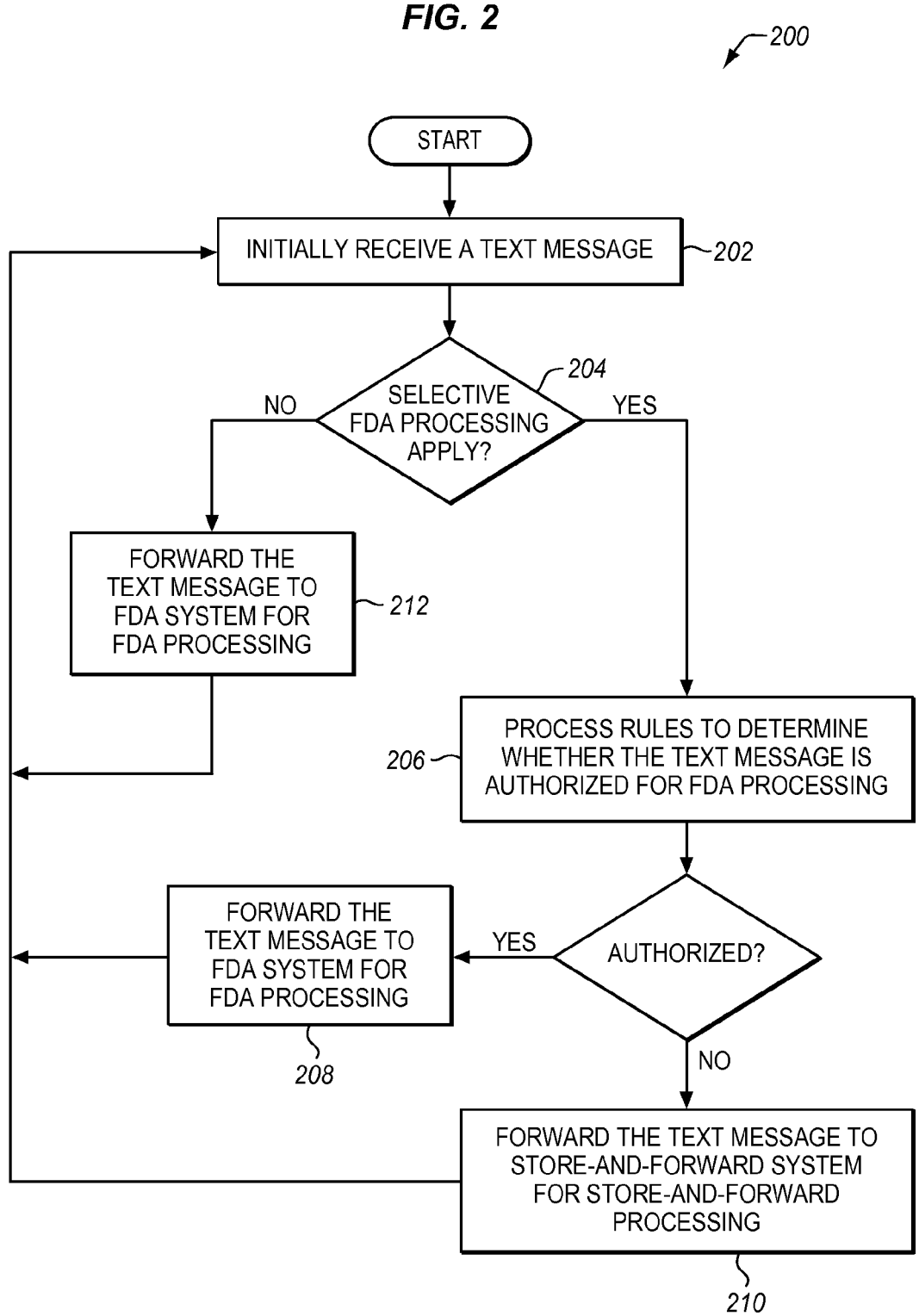
FIG. 2 is a flow chart illustrating a method of selectively applying FDA processing for a text messages in an exemplary embodiment.

FIG. 2 is a flow chart illustrating a method 200 of selectively applying FDA processing for text messages in an exemplary embodiment. The steps of method 200 will be described with reference to mobile network 100 in FIG. 1, but those skilled in the art will appreciate that method 200 may be performed in other networks and systems. Also, the steps of the flow chart in FIG. 2 are not all inclusive and may include other steps not shown. The steps may be performed in an alternative order.

In step 202, message processor 134 initially receives the text message from sender 110. Instead of automatically forwarding the text message to FDA system 132 for FDA processing, message processor 134 determines whether to selectively apply FDA processing in step 204. Selective FDA processing means that normal FDA processing is interrupted for a time period, and that a selected set of zero or more text messages will be authorized for FDA processing. Selective FDA processing is applied responsive to a triggering event. Events that trigger selective FDA processing may vary depending on the desires of the network operator.

For example, the triggering event may comprise a peak traffic interval (i.e., time of day) being reached. The network operator may identify peak traffic intervals of text messaging within mobile network 100. If the peak traffic interval is reached, then message processor 134 may trigger selective FDA processing during this time interval. In another example, the triggering event may comprise a traffic threshold being exceeded within mobile network 100. If the traffic threshold is exceeded, then message processor 134 may trigger selective FDA processing while the traffic exceeds the threshold. In yet another example, the triggering event may comprise a special traffic scenario expected to occur within a service area of mobile network 100. For example, if the network operator is aware of a fan survey or fan voting for a television program, then message processor 134 may trigger selective FDA processing during the special traffic scenario. In a further example, the triggering event may comprise a text message identified as spam. If the text is identified as spam, then message processor 134 may trigger selective FDA processing so that the spam message is filtered. In a further example, the triggering event may comprise a billing problem for the text message. If the billing problem is identified (e.g., if the source address, destination address, and/or billing ID do not meet operator chargeable criteria), then message processor 134 may trigger selective FDA processing to defer the text message to store-and-forward system 122.

If selective FDA processing applies, then message processor 134 processes the rules in rules database 136 to determine whether the text message is authorized for FDA processing during the time period of selective FDA processing in step 206. The rules that authorize FDA processing may vary depending on the desires of the network operator. Some examples are provided below.

If the determination in step 206 is that the text message is authorized, then message processor 134 forwards the text message to FDA system 132 for FDA processing in step 208. In response to receiving the text message, FDA system 132 attempts to deliver the text message to destination 112 first without persistently storing the text message. If the delivery attempt fails, then FDA system 132 may forward the text message to store-and-forward system 122 for store-and-forward processing.

If the determination in step 206 is that the text message is not authorized, then message processor 134 forwards the text message to store-and-forward system 122 for store-and-forward processing in step 210. In response to receiving the text message, store-and-forward system 122 persistently stores the text message in memory. Store-and-forward system 122 then attempts to deliver the text message to destination 112. If the first delivery attempt is unsuccessful, then store-and-forward system 122 retries delivery after a time period (e.g., 10 minutes, 30 minutes, etc). Store-and-forward system 122 will retry delivery of the text message a predefined number of times, after which the text message is discarded.

If the determination in step 204 is that the selective FDA processing does not apply, then message processor 134 forwards the text message to FDA system 132 for FDA processing in step 212. Normal FDA processing may then take place.

Once triggered, message processor 134 continues to apply selective FDA processing for other text messages until the time period expires. The time period for applying selective FDA processing may vary as a function of the triggering event. For example, if the triggering event is a peak traffic interval being reached, then the time period may be set based on how long the peak traffic interval lasts (e.g., 4 hours). If the triggering event is a traffic threshold being exceeded, then the time period may last until the traffic in mobile network 100 decreases below the traffic threshold. If the triggering event is that the text message comprises spam (or is suspected of being spam), then the time period may only last as long as it takes to process this spam message. After the time period for applying selective FDA processing expires, normal FDA processing may then take place. Thus, message processor 134 forwards each of the received text messages to FDA system 132 until another event occurs that triggers selective FDA processing.

The selective FDA processing advantageously allows the network operator to offload some or all text messages from FDA processing to store-and-forward processing for a time period. Store-and-forward processing helps to avoid the network congestion problems encountered by FDA processing.

Thus, in times of high traffic volume within mobile network 100, the network operator can avoid delays in FDA system 132, and ultimately the loss of text messages.

The following lists some exemplary rules that may be used to determine whether a text message is authorized for FDA processing during the time period of selective FDA processing (see step 206). One rule may comprise a source address rule that indicates one or more source addresses that are authorized or unauthorized for FDA processing during the time period of selective FDA processing. For example, if the source address of the text message is on an authorized list (or white list) of addresses, then the text message will be authorized for FDA processing. If the source address of the text message is on an unauthorized list of addresses (or black list), then the text message will not be authorized for FDA processing and will fail over to store-and-forward processing.

Another rule may comprise a destination address rule that indicates one or more destination addresses that are authorized or unauthorized for FDA processing during the time period of selective FDA processing. For example, if the destination address of the text message is on an authorized list of addresses, then the text message will be authorized for FDA processing. If the destination address of the text message is on an unauthorized list of addresses, then the text message will not be authorized for FDA processing and will fail over to store-and-forward processing.

Another rule may comprise a failed destination address rule that indicates particular destinations or destination ranges that have a history of failed delivery. For example, if the destination address of the text message is on a list addresses that have a history of failed delivery, then the text message will not be authorized for FDA processing and will fail over to store-and-forward processing.

Another rule may comprise a destination point code rule that indicates one or more destination point codes that are authorized or unauthorized for FDA processing during the time period of selective FDA processing. For example, if the destination point code of the text message is on an authorized list of point codes, then the text message will be authorized for FDA processing. If the destination point code of the text message is on an unauthorized list of point codes, then the text message will not be authorized for FDA processing and will fail over to store-and-forward processing.

Another rule may comprise a roaming rule that specifies that text messages originated by or destined for a roaming user will not be authorized for FDA processing and will fail over to store-and-forward processing.

Another rule may comprise a protocol ID rule that indicates which network protocols are authorized or unauthorized for FDA processing during the time period of selective FDA processing. For example, the rule may specify that text messages for IS41 and GSM protocols are authorized, but that text messages for GPRS protocol are not authorized.

Another rule may comprise a tele-service rule that indicates which tele-services are authorized or unauthorized for FDA processing during the time period of selective FDA processing. For example, the rule may specify that WMI and VMN are authorized, but that page, pass, WAP, and EMS are not authorized.

Another rule may comprise an air-interface rule that indicates which air-interface protocols are authorized or unauthorized for FDA processing during the time period of selective FDA processing. For example, the rule may specify that text messages for CDMA and W-CDMA protocols are authorized, but that text messages for TDMA and GSM protocols are not authorized.

Another rule may comprise a routing type rule that indicates which routing types (e.g., SS7, IP (ESME), dedicated port, etc) are authorized or unauthorized for FDA processing during the time period of selective FDA processing. Another rule may comprise a service type rule that indicates while service types (e.g., administrative, page, WMI, VMN, Location Based Service (LBS), broadcast, etc) are authorized or unauthorized for FDA processing during the time period of selective FDA processing.

Another rule may comprise a billing ID rule that indicates while types of billing are authorized or unauthorized for FDA processing during the time period of selective FDA processing. For example, the rule may specify that text messages that are prepaid are authorized, but that text messages that are post paid are not authorized. There may be a variety of other rules that may be defined. Also, multiple rules may be processed to authorize a text message. If any of the rules are in conflict, then the network operator may define which rules control whether or not the text message is authorized.

EXAMPLE

Figure 3:
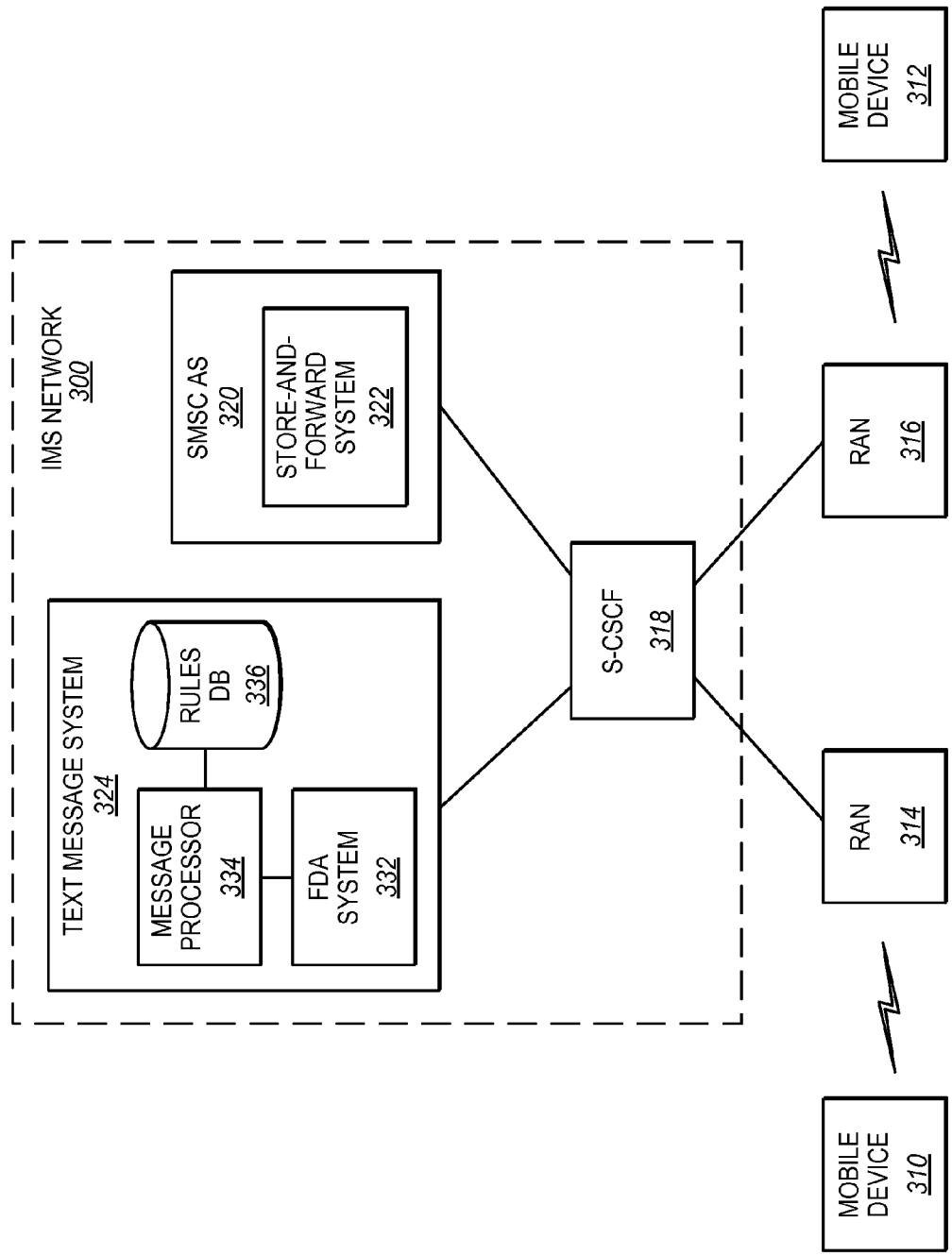
FIG. 3 illustrates an IMS network in an exemplary embodiment.

FIG. 3 illustrates an IMS network 300 in an exemplary embodiment. In this embodiment, IMS network 300 is operable to serve a mobile device 310 through a Radio Access Network (RAN) 314, which comprises any radio or wireless network that interfaces a mobile device with a core network. To serve mobile device 310, IMS network 300 includes a Serving-Call Session Control Function (S-CSCF) 318, an SMS application server (AS) 320, and a text message system 324. SMS application server 320 is operable to handle SMS messages. For example, SMS application server 320 may represent an SMSC. As part of handling SMS messages, SMS application server 320 includes store-and-forward system 322 that uses SMS protocol. Store-and-forward system 322 is able to deliver SMS messages to destinations using store-and-forward processing, such as delivering an SMS message to mobile device 312 through RAN 316.

Text message system 324 includes an FDA system 332, a message processor 334, and a rules database 336. Text message system 324 is programmed to use FDA system 332 to attempt delivery of SMS messages to their destination before forwarding the SMS messages to SMS AS 320. FDA system 332 is able to deliver SMS messages to destinations using FDA processing, such as delivering an SMS message to mobile device 312 through RAN 316. Text message system 324 is also programmed to apply selective FDA processing responsive to a triggering event, some of which were described above. Assume for this example that the network operator of IMS network 300 has defined a peak traffic interval in IMS network 300 where SMS message traffic is normally high. When this peak traffic interval is reached, text message system 324 will trigger selective FDA processing.

Assume further for this example that a user of mobile device 310 initiates an SMS message to a user of mobile device 312. Mobile device 310 encapsulates the SMS message in a SIP MESSAGE, and sends the SIP MESSAGE to S-CSCF 318. S-CSCF 318 processes the SIP MESSAGE and determines that it includes an SMS message. Thus, S-CSCF 318 forwards the SIP MESSAGE to text message system 324.

Figure 4:
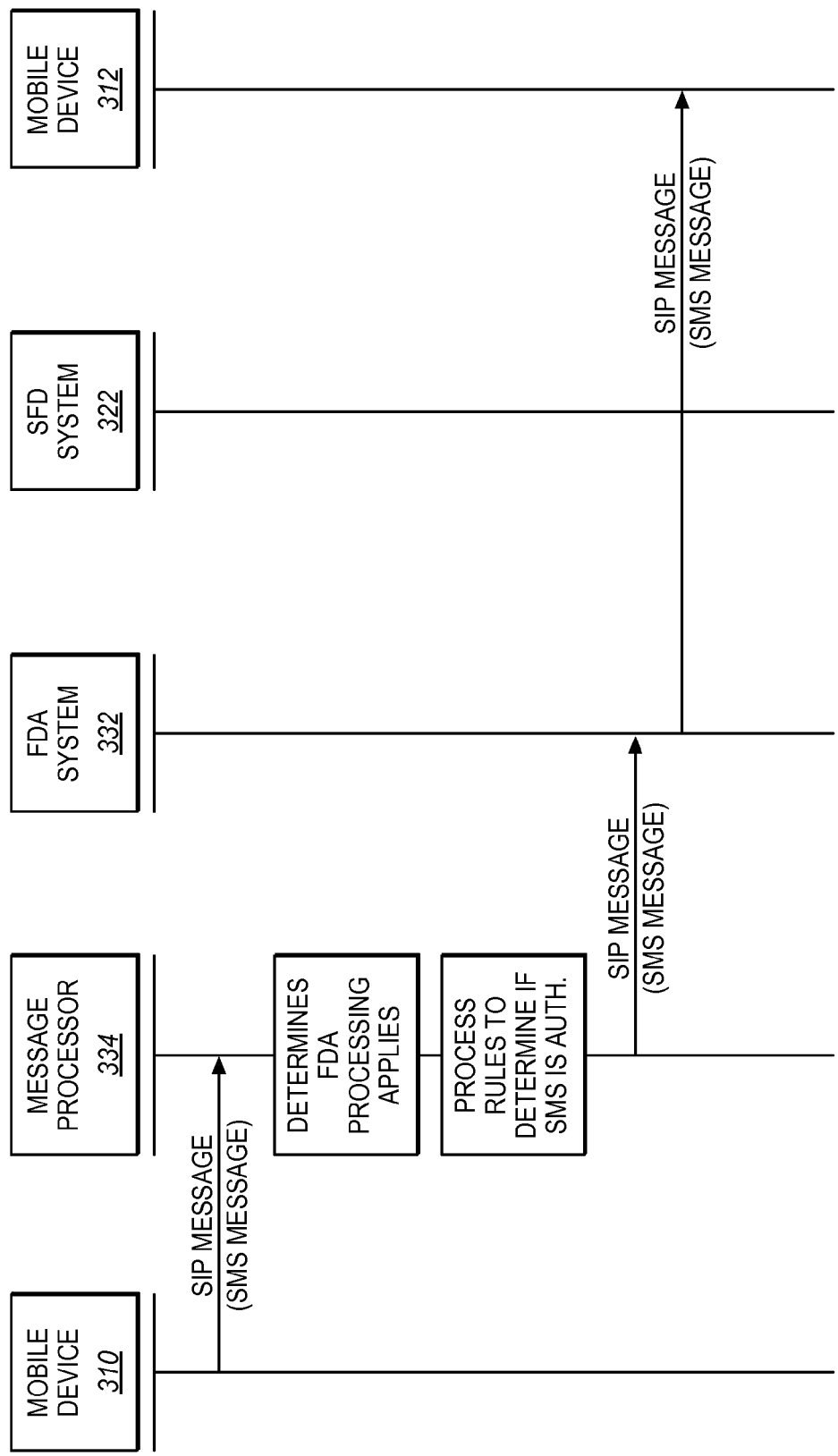
FIGS. 4-5 are message diagrams illustrating selective FDA processing in an exemplary embodiment.
Figure 5:
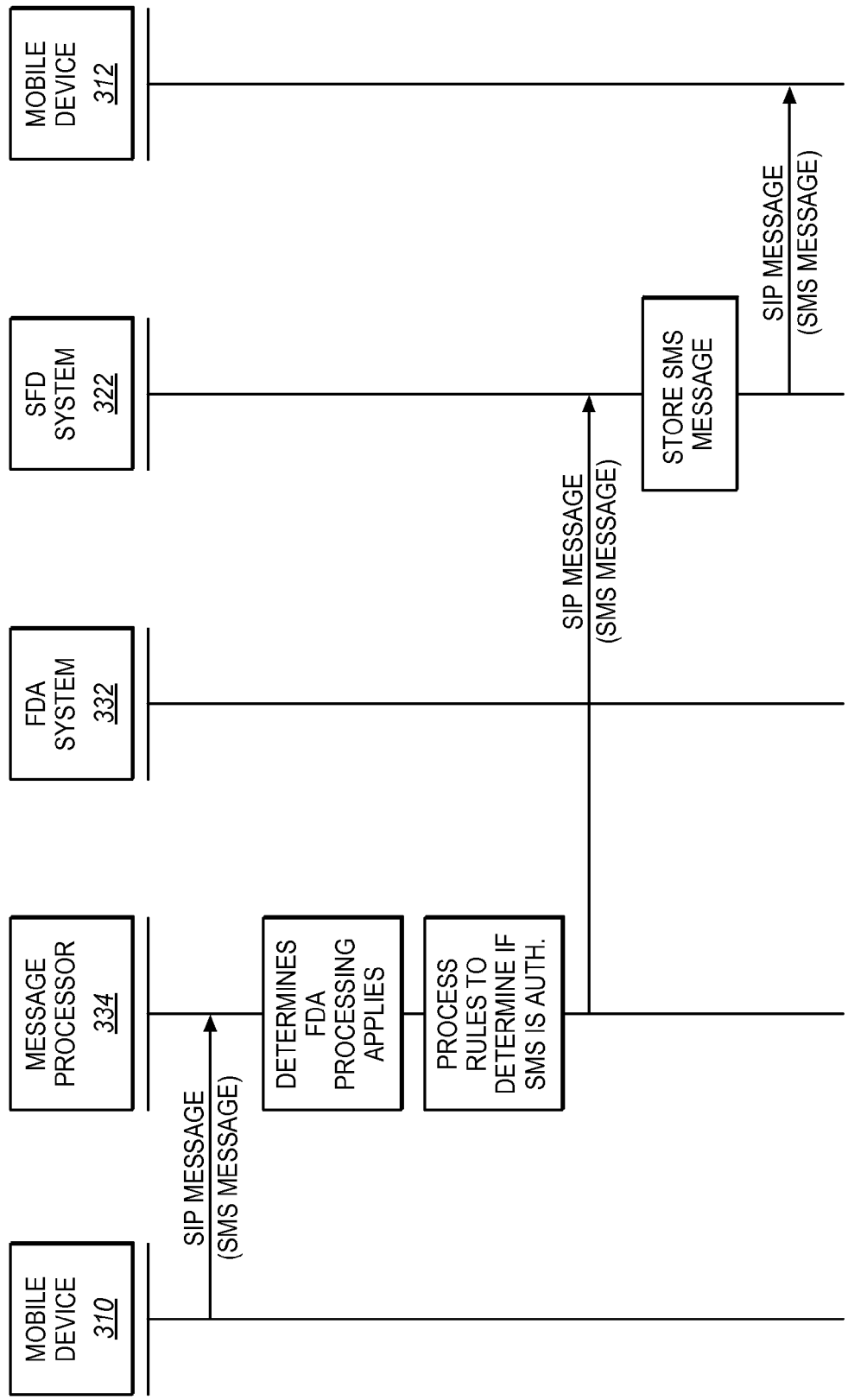

FIGS. 4-5 are message diagrams illustrating selective FDA processing in an exemplary embodiment. In FIG. 4, message processor 334 receives the SIP MESSAGE that includes the SMS message. Instead of automatically forwarding the SMS message to FDA system 332 for FDA processing, message processor 334 determines whether selective FDA processing applies. In this case, the peak time interval has been reached, so selective FDA processing is triggered. Thus, message processor 334 processes the rules (in rules database 336 of FIG. 3) to determine whether the SMS message is authorized for FDA processing. If the determination is that the SMS message is authorized, then message processor 334 forwards the SMS message to FDA system 332 for FDA processing. In response to receiving the SMS message, FDA system 332 attempts to deliver the SMS message to its destination first without persistently storing the SMS message by sending the SIP MESSAGE to mobile device 312 (through S-CSCF 318 in FIG. 3). If the delivery attempt fails, then FDA system 332 may forward the SMS message to SMS application server 320 for store-and-forward processing.

In the example of FIG. 4, the SMS message was authorized for FDA processing, so FDA system 332 attempted to deliver the message. When the SMS message is not authorized for FDA processing, the SMS message is sent to SMS AS 320 for store-and-forward processing, which is illustrated in FIG. 5.

In FIG. 5, message processor 334 again receives the SIP MESSAGE that includes the SMS message. Instead of automatically forwarding the SMS message to FDA system 332 for FDA processing, message processor 334 determines whether selective FDA processing applies. In this case, the peak time interval has been reached, so selective FDA processing is triggered. Thus, message processor 334 processes the rules (in rules database 336 of FIG. 3) to determine whether the SMS message is authorized for FDA processing. If the determination is that the SMS message is not authorized, then message processor 334 forwards the SMS message to store-and-forward (SFD) system 322 for store-and-forward processing. In response to receiving the SMS message, store-and-forward system 322 persistently stores the SMS message in memory. Store-and-forward system 322 then attempts to deliver the SMS message to its destination by sending the SIP MESSAGE to mobile device 312 (through S-CSCF 318 in FIG. 3).

In the example of FIG. 5, the SMS message is offloaded to store-and-forward system 322 for processing instead of FDA system 332. During this peak time interval of high traffic, store-and-forward system 322 may be better able to handle the SMS message instead of FDA system 332. Thus, the SMS message has a higher likelihood of being successfully delivered to mobile device 312.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. An apparatus comprising:
a text message system configured to interrupt automatic first delivery attempt (FDA) processing for a text message when a network condition has existed within a preceding length of time of receipt of the text message, and to determine whether or not the text message is authorized for FDA processing;
the text message system is configured to forward the text message to a store-and-forward (SFD) system for SFD processing only when the text message is not authorized for FDA processing.

2. The apparatus of claim 1 wherein:
the text message system is configured to forward the text message to an FDA system for FDA processing when the text message is authorized for FDA processing.

3. The apparatus of claim 1 wherein:
the text message system is configured to determine whether or not the text message is authorized for FDA processing based on a source address for the text message.

4. The apparatus of claim 1 wherein:
the text message system is configured to determine whether or not the text message is authorized for FDA processing based on a destination address for the text message.

5. The apparatus of claim 1 wherein:
the text message system is configured to determine whether or not the text message is authorized for FDA processing based on whether a party to the text message is roaming.

6. A method operable in a text message system, the method comprising:
detecting, in the text message system, that a network condition has existed within a preceding length of time of receipt of a text message;
interrupting automatic first delivery attempt (FDA) processing for the text message due to the network condition;
determining whether or not the text message is authorized for first delivery attempt (FDA) processing; and
forwarding the text message to a store-and-forward (SFD) system for SFD processing only when the text message is not authorized for FDA processing.

7. The method of claim 6 further comprising:
forwarding the text message to an FDA system for FDA processing when the text message is authorized for FDA processing.

8. The method of claim 6 wherein determining whether or not the text message is authorized for FDA processing comprises:
determining whether or not the text message is authorized for FDA processing based on a source address for the text message.

9. The method of claim 6 wherein determining whether or not the text message is authorized for FDA processing comprises:
determining whether or not the text message is authorized for FDA processing based on a destination address for the text message.

10. The method of claim 6 wherein determining whether or not the text message is authorized for FDA processing comprises:
determining whether or not the text message is authorized for FDA processing based on whether a party to the text message is roaming.

11. A text messaging apparatus for use in a wireless system, the apparatus comprising:
means for interrupting automatic first delivery attempt (FDA) processing for a text message when a network condition has existed within a preceding length of time of receipt of the text message;
means for determining whether or not the text message is authorized for FDA processing; and
means for forwarding the text message for processing to a text message delivery system, wherein the text message delivery system comprises a store-and-forward (SFD) system only when the means for determining determines that the text message is not authorized for FDA processing.

12. The apparatus of claim 11 further comprising:
means for forwarding the text message to an FDA system for FDA processing when the text message is authorized for FDA processing.

13. The apparatus of claim 11 wherein:
the network condition comprises a peak traffic interval within the wireless system.

14. An apparatus comprising:
a text message system for a mobile network that is configured to apply automatic first delivery attempt (FDA) processing for delivering text messages;
the text message system is configured to detect an event that interrupts the automatic FDA processing and triggers selective FDA processing for a time period;
during the time period of selective FDA processing, the text message system is configured to receive a text message, to determine whether FDA processing is authorized for the text message during the time period of selective FDA processing, to apply FDA processing for the text message responsive to a determination that the text message is authorized for FDA processing, and to apply store-and-forward (SFD) processing for the text message responsive to a determination that the text message is not authorized for FDA processing.

15. The apparatus of claim 14 wherein:
after the time period of selective FDA processing expires, the text message system is configured to apply the automatic FDA processing for subsequent text messages.

16. The apparatus of claim 14 wherein:
the time period for applying selective FDA processing is a function of the event that triggers the selective FDA processing within the text message system.

17. The apparatus of claim 14 wherein:
the text message system is configured to determine whether FDA processing is authorized for the text message based on a source address rule that indicates at least one source address that is authorized for FDA processing during the time period of selective FDA processing.

18. The apparatus of claim 14 wherein:
the text message system is configured to determine whether FDA processing is authorized for the text message based on a destination address rule that indicates at least one destination address that is authorized for FDA processing during the time period of selective FDA processing.

19. The apparatus of claim 14 wherein:
the text message system is configured to determine whether FDA processing is authorized for the text message based on a roaming rule which specifies that roaming users are not authorized for FDA processing during the time period of selective FDA processing.

20. The apparatus of claim 14 wherein:
the event that triggers selective FDA processing comprises a peak traffic interval within the mobile network.

* * * * *